United States Patent [19]

Oishi

[11] Patent Number: 4,612,593
[45] Date of Patent: Sep. 16, 1986

[54] TAPE PAD FOR USE IN MAGNETIC RECORDING TAPE CASSETTE

[75] Inventor: Kengo Oishi, Odawara, Japan
[73] Assignee: Fuji Photo Film Co., Ltd., Japan
[21] Appl. No.: 448,620
[22] Filed: Dec. 10, 1982

Related U.S. Application Data

[63] Continuation-in-part of Ser. No. 414,065, Sep. 2, 1982, abandoned.

[30] Foreign Application Priority Data

Sep. 3, 1981 [JP] Japan ............................. 56-131322

[51] Int. Cl.⁴ .............................................. G11B 15/62
[52] U.S. Cl. ............................. 360/130.31; 360/130.3
[58] Field of Search ............... 360/128, 130.2–130.21, 360/130.3–130.33; 428/280–282, 303; 242/199

[56] References Cited

U.S. PATENT DOCUMENTS 3,682,486 8/1972 Zwetzig et al. ................ 360/130.33
4,314,299 2/1982 Ishida et al. ......................... 360/132

FOREIGN PATENT DOCUMENTS 2018492 10/1979 United Kingdom .......... 360/130.33

OTHER PUBLICATIONS

Fisher et al, RCA Technical Notes No. 1124, "Sponge Pad Design For Tape Cartridge," 8/11/75.

Primary Examiner—John H. Wolff
Assistant Examiner—David J. Severin
Attorney, Agent, or Firm—Lucas & Just

[57] ABSTRACT

A tape pad for use in a magnetic recording tape cassette for pressing the recording tape against the magnetic head of a tape recorder comprises a felt piece having the following characteristics:
fulling density: 0.35 to 0.4 g/cm³
average diameter of fibers: 0.016 to 0.035 mm
average length of fibers: 1.4 to 5.0 mm
surface roughness: 0.05 to 0.15 mm 1 Claim, 1 Drawing Figure

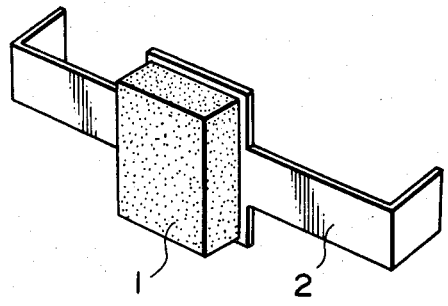

TAPE PAD FOR USE IN MAGNETIC RECORDING TAPE CASSETTE

The present application is a continuation-in-part of application Ser. No. 414,065 filed Sept. 2, 1982 and now abandoned.

BACKGROUND OF THE INVENTION

1. Field of the Invention

This invention relates to a magnetic recording tape cassette, and more particularly to a tape pad for use in a magnetic recording tape cassette for pressing the tape against the magnetic head of a recorder.

2. Description of the Prior Art

Recently, there have come into wide use in addition to standard type magnetic recording tapes, various types of magnetic recording tapes such as low noise type tapes, chrome tapes, and metallic tapes. Further, there have been developed various types of tape recorders which can change the tape feeding speed from the standard speed to half speed and/or double speed in order to change the recording bias or the reproducing equalizer, to lengthen the recording-reproducing time, or to improve the reproducing characteristics for making the best use of the properties of each type of tape. As is well known, the micro cassette tape recorder is arranged so that the tape can be fed either at 2.4 cm/sec. or 1.2 cm/sec.

In the tape speed variable tape recorder, it is expected that the electromagnetic conversion characteristics of the reproducing output or the like will be improved when the tape feeding speed is increased or the recorder is set to the double speed mode. However, conventionally, the expected improvement of the electromagnetic conversion characteristics could not be obtained. This is because the state of contact between the magnetic tape and the magnetic head becomes bad when the tape feeding speed is increased.

It has been found that the electromagnetic conversion characteristics at high tape feeding speed can be improved by improving the characteristics of the tape pad for pressing the magnetic recording tape against the magnetic head e.g. the surface evenness of the tape pad.

Generally, the tape pad is formed of felt. When making the tape pad, raw fur which, may be wool or rabbit fur, is pressed into a plate like form in a fulling step and then dyed a desired color. Thereafter, the plate-like body is subjected to a shearing step to produce surface evenness and then sliced to a desired thickness. On one surface of the sliced felt piece is attached a double-sided adhesive tape and the sliced felt piece is cut into the size required for the tape pad. The cut felt piece thus obtained is attached to a plate spring using the double-sided adhesive tape.

If the magnetic recording tape is pressed against the magnetic head with a tape pad having poor surface evenness, the magnetic recording tape cannot be uniformly brought into contact with the surface, especially the head gap portion, of the magnetic head. Therefore, the spacing loss is apt to occur upon recording and reproduction, and there arises significant deterioration in a high frequency tone. Further the contact force of the magnetic recording tape against the magnetic head changes subtly near the head gap and the fluctuation in the reproduced output is increased. This tendency becomes more significant as the tape feeding speed is increased.

When the length of the fibers (fur) of the felt is too short, the fibers cannot get intimately entwined and are apt to be dislodged from the surface of the pad. The dislodged fibers adhere to the tape and/or the magnetic head to cause "drop-out". When the length of the fibers is excessively long, the fibers cannot get uniformly entwined and ends of fibers are apt to project from the surface of the pad. The projecting end portion of a fiber, when once sandwiched between the tape and head, is apt to stay in that position since the other end thereof is secured to the pad. This causes "reproduction level drop", that is, lowering in the output level for a time longer than drop-out. This tendency is significant when the tape feeding speed is low.

SUMMARY OF THE INVENTION

In view of the foregoing observations and description, the primary object of the present invention is to provide a tape pad for a tape cassette which exhibits stabilized characteristics for various types of tape recorders including table type recorders, portable type recorders, compact type recorders and micro cassette recorders.

The tape pad of the present invention is characterized in that at least the part thereof actually brought into contact with the magnetic head of the tape recorder has following characteristics in the final state.

fulling density: 0.35 to 0.4 g/cm$^3$
average diameter of fibers: 0.016 to 0.035 mm
average length of fibers: 1.4 to 5.0 mm
surface roughness: 0.05 to 0.15 mm

BRIEF DESCRIPTION OF THE DRAWING

The single FIGURE is an outside view of a tape pad in accordance with an embodiment of the present invention.

DETAILED DESCRIPTION OF THE INVENTION

A plurality of tape pads (samples A to F) having different characteristics were prepared and the electromagnetic conversion characteristics of a magnetic recording tape when using each tape pad was measured. The results are shown in the following table. Each tape pad comprised a felt piece 1 and a plate spring 2 attached to each other by a double-sided adhesive tape as shown in the FIGURE.

The felt pieces 1 of the samples B to F were prepared using the conventional method described above excepting that the fulling step and the shearing step were repeated until desired density and surface evenness were obtained. Wool was used as the raw material. The electromagnetic conversion characteristics were measured using a TC-K61 (SONY CO.) cassette tape recorder and a KDA-55 (JAPAN VICTOR CO.) cassette tape recorder and using a two-hub cassette tape ER C-60 (FUJI PHOTO FILM CO., LTD.). The reproduced output and the output fluctuation were measured with a sine wave input signal of 10 KHz, 20 dB. The reproduced output of each sample is shown with the reproduced output when the conventional pad (sample A) was used being assumed as 0 dB.

The number of drop-outs was counted using input signals of 8 KHz regarding a lowering of signal level by 3 or more decibels as drop-out. The number of drop-outs was counted by recording the output signals using a level recorder while running the tape only one way (A side) after reciprocating the tape one hundred times.

The number of reproduction level drop was counted regarding a lowering of signal level by 3 or more decibels for 30 or more seconds as reproduction level drop in the measurement of the drop-out.

As can be seen from the table, when the fulling density was high as in samples B to E, the reproduction output became high and the output fluctuation was reduced. However, if the surface evenness was not good as in samples A and F, the output fluctuation was not so improved.

When the fulling density was very low as in samples A and F, the reproduced output and the output fluctuation were not improved and, moreover, drop-out and reproduction level drop frequently occurred. Reproduction level drop is a fatal defect.

As can be seen from the table, the high frequency tone reproducing output was improved and the reproduced output was stabilized when a tape pad of the present invention (samples D and E) was used. Further, when the tape pad of the present invention was used, the number of the drop-outs was reduced and reproduction level drop did not occur.

The tape pad of the present invention is suitable for high density recording.

TABLE

| | | Reproduction output (10 KHz) | | Reproduction output fluctuation (10 KHz) | | drop-out (8 KHz) | | Reproduction level drop (number/whole length) | |
|---|---|---|---|---|---|---|---|---|---|
| Sample | Characteristics | SONY | VICTOR | SONY | VICTOR | SONY | VICTOR | SONY | VICTOR |
| A (conventional) | Average fiber length 6.9 mm<br>Average fiber diameter 0.05 mm<br>Fulling density 0.31 g/m³<br>Surface roughness 180μ | 0 dB | 0 dB | 0.3–0.5 dB | 0.35–0.45 dB | 3 | 4 | 0 | 0 |
| B | Average fiber length 5.0 mm<br>Average fiber diameter 0.035 mm<br>Fulling density 0.35 g/m³<br>Surface roughness 150μ | +0.2 | +0.2 | 0.2–0.4 | 0.3 | 2 | 3 | 0 | 0 |
| C | Average fiber length 2.0 mm<br>Average fiber diameter 0.02 mm<br>Fulling density 0.39 g/m³<br>Surface roughness 120μ | +0.5 | +0.7 | 0.2–0.4 | 0.3 | 1 | 2 | 0 | 0 |
| D (this invention) | Average fiber length 1.8 mm<br>Average fiber diameter 0.019 mm<br>Fulling density 0.40 g/m³<br>Surface roughness 90μ | +0.5– +0.9 | +0.7– +1.2 | 0.2 | 0.2 | 0 | 0 | 0 | 0 |
| E (this invention) | Average fiber length 1.4 mm<br>Average fiber diameter 0.016 mm<br>Fulling density 0.40 g/m³<br>Surface roughness 50μ | +1.1 | +0.9– +1.9 | 0.2 | 0.1–0.2 | 0 | 1 | 0 | 0 |
| F | Average fiber length 1.8 mm<br>Average fiber diameter 0.056 mm<br>Fulling density 0.28 g/m³<br>Surface roughness 170μ | 0 | 0 | 0.5 | 0.4–0.5 | 3 | 3 | 1 | 0 |

In the above table, the characteristics of the felt piece were determined as follows.

Average fiber length — Fibers on the surface of the felt piece were picked up and the lengths of the picked-up fibers were measured by a KIRUBIMETER (UCHIDA YOKO K.K.) while being enlarged by an enlarging projector. The reported values were obtained by converting the measured values into values in the linear state.

Average fiber diameter — Measured in a manner similar to the measurement of the average fiber length.

Fulling density — The weight of the felt piece was measured according to JIS L3201 and the thickness of the felt piece was measured using calipers. Then weight/thickness was calculated.

Surface roughness — Measured using a SURFCOM 800A surface roughness meter (TOKYO SEIMITSU). The contact probe having a contact end of 0.80 was used.

What is claimed is:

1. A tape pad for use in a magnetic recording tape cassettes for pressing a magnetic recording tape against a magnetic head of a tape recorder, the tape pad comprising a felt pad characterized in that at least the part of the felt pad brought into contact with the magnetic recording tape has an average density of 0.35 to 0.4 g/cm³, an average diameter of fibers of 0.016 to 0.035 mm, an average length of fibers of 1.4 to 5.0 mm, and a surface roughness of 0.05 to 0.15 mm thereby improving the electromagnetic conversion characteristics of the magnetic recording tape.

* * * * *